United States Patent
Cui et al.

(10) Patent No.: US 9,374,773 B2
(45) Date of Patent: Jun. 21, 2016

(54) TRAFFIC STEERING ACROSS CELL-TYPES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US); Ye Chen, Sandy Springs, GA (US); Thomas W. Henderson, Alpharetta, GA (US); Yonghui Tong, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 407 days.

(21) Appl. No.: 13/707,538

(22) Filed: Dec. 6, 2012

(65) Prior Publication Data
US 2014/0162635 A1    Jun. 12, 2014

(51) Int. Cl.
*H04W 48/18* (2009.01)
*H04W 48/12* (2009.01)
*H04W 48/20* (2009.01)

(52) U.S. Cl.
CPC ............ *H04W 48/18* (2013.01); *H04W 48/12* (2013.01); *H04W 48/20* (2013.01)

(58) Field of Classification Search
CPC .................................................. H04W 48/18
See application file for complete search history.

(56) References Cited

U.S. PATENT DOCUMENTS

| | | | |
|---|---|---|---|
| 5,953,677 A | 9/1999 | Sato | |
| 6,314,308 B1 | 11/2001 | Sheynblat et al. | |
| 6,430,168 B1 | 8/2002 | Djurkovic et al. | |
| 6,628,946 B1 | 9/2003 | Wiberg et al. | |
| 7,082,305 B2 | 7/2006 | Willars et al. | |
| 7,116,970 B2 | 10/2006 | Brusilovsky et al. | |
| 7,146,130 B2 | 12/2006 | Hsu et al. | |
| 7,299,019 B1 | 11/2007 | Austin et al. | |
| 7,400,600 B2 | 7/2008 | Mullany et al. | |
| 7,400,886 B2 | 7/2008 | Sahim et al. | |
| 7,440,755 B2 | 10/2008 | Balachandran | |
| 7,496,060 B2 | 2/2009 | Ramirez et al. | |
| 7,508,781 B2 | 3/2009 | Liu et al. | |

(Continued)

FOREIGN PATENT DOCUMENTS

| AU | 2005320356 | 12/2005 |
|---|---|---|
| EP | 2244503 | 10/2010 |

(Continued)

OTHER PUBLICATIONS

U.S. Appl. No. 13/707,531, filed Dec. 6, 2012.

(Continued)

*Primary Examiner* — Mazda Sabouri
(74) *Attorney, Agent, or Firm* — Hartman & Citrin LLC

(57) ABSTRACT

Concepts and technologies are described herein for traffic steering across cell-types. According to one aspect disclosed herein, a mobile device enables radio access network ("RAN") selection across multiple cell-types, including, but not limited to, macro cells, metro cells, femto cells, pico cells, and the like, based upon network conditions, local device information, and/or other information such as policies and user profiles. The local device information can include, but is not limited to, mobility state information, performance measurement information, battery utilization information, channel quality information, and user overrides.

20 Claims, 9 Drawing Sheets

(56) References Cited

U.S. PATENT DOCUMENTS

| | | |
|---|---|---|
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulous |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2004/0165538 A1 | 8/2004 | Swami |
| 2005/0227696 A1 | 10/2005 | Kaplan et al. |
| 2006/0128394 A1 | 6/2006 | Turina et al. |
| 2006/0166677 A1* | 7/2006 | Derakshan et al. ........... 455/453 |
| 2006/0199608 A1 | 9/2006 | Dunn et al. |
| 2007/0026854 A1 | 2/2007 | Nath et al. |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1 | 11/2007 | Hande et al. |
| 2007/0286092 A1 | 12/2007 | Famolari et al. |
| 2008/0144577 A1* | 6/2008 | Huang et al. .................. 370/331 |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1 | 10/2009 | Vigue et al. |
| 2010/0048205 A1 | 2/2010 | Guilford et al. |
| 2010/0056153 A1 | 3/2010 | Attar et al. |
| 2010/0056181 A1 | 3/2010 | Rippon et al. |
| 2010/0110890 A1 | 5/2010 | Rainer et al. |
| 2010/0136978 A1 | 6/2010 | Cho et al. |
| 2010/0149971 A1 | 6/2010 | Noriega |
| 2010/0234021 A1 | 9/2010 | Ngai et al. |
| 2010/0234042 A1 | 9/2010 | Chan et al. |
| 2010/0255849 A1 | 10/2010 | Ore |
| 2010/0267384 A1 | 10/2010 | Dwyer et al. |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1 | 12/2010 | Mueck et al. |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1 | 7/2011 | Yang et al. |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1* | 8/2012 | Bienas ................. H04W 24/10<br>370/332 |
| 2012/0214525 A1 | 8/2012 | Fujii et al. |
| 2012/0236717 A1 | 9/2012 | Saska et al. |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1* | 1/2013 | Dimou et al. ................. 455/441 |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1* | 2/2013 | Lee et al. ..................... 455/436 |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143542 A1 | 6/2013 | Kovvali et al. |
| 2013/0155849 A1 | 6/2013 | Koodli et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 | 7/2013 | Zhuang et al. |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0029420 A1 | 1/2014 | Jeong et al. |
| 2014/0092306 A1 | 4/2014 | Lee et al. |
| 2014/0092734 A1 | 4/2014 | Lijung |
| 2014/0099945 A1 | 4/2014 | Singh et al. |
| 2014/0128074 A1 | 5/2014 | Vangala et al. |
| 2014/0141785 A1 | 5/2014 | Wang et al. |
| 2014/0161256 A1 | 6/2014 | Bari et al. |
| 2014/0204745 A1 | 7/2014 | Nuss |
| 2014/0247810 A1* | 9/2014 | Bontu et al. .................. 370/332 |
| 2014/0274066 A1 | 9/2014 | Fodor et al. |
| 2014/0335870 A1* | 11/2014 | Yilmaz et al. ................. 455/441 |
| 2015/0208280 A1 | 7/2015 | Lorca Hernando |
| 2015/0244520 A1 | 8/2015 | Kariman |

FOREIGN PATENT DOCUMENTS

| | | |
|---|---|---|
| EP | 2197228 | 12/2011 |
| EP | 2533571 | 12/2012 |
| EP | 2632072 | 8/2013 |
| EP | 2603046 | 12/2013 |
| WO | WO 2010/130134 | 11/2010 |

(56) References Cited

FOREIGN PATENT DOCUMENTS

| WO | WO 2011/053204 | 5/2011 |
|---|---|---|
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

U.S. Appl. No. 13/707,551, filed Dec. 6, 2012.
U.S. Appl. No. 13/707,532, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
Office Action mailed Jun. 27, 2012 in U.S. Appl. No. 12/946,611.
Office Action mailed Mar. 22, 2012 in U.S. Appl. No. 12/946,611.
Office Action mailed Mar. 13, 2012 in U.S. Appl. No. 12/624,643.
Notice of Allowance mailed Aug. 8, 2012 in U.S. Appl. No. 12/624,643.
Office Action mailed Apr. 22, 2013 in U.S. Appl. No. 13/681,141.
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026, 3GPP TSG-RAN3 Meeting #73, Athens, Greece, Aug. 22-26, 2011 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996):82-90. http://inrg.csie.ntu.edu.tw/course/wms/paper/Pollin96.pdf.
Office Action mailed Sep. 13, 2013 in U.S. Appl. No. 13/681,141.
Notice of Allowance mailed Nov. 2, 2012 in U.S. Appl. No. 12/946,611.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
U.S. Appl. No. 13/707,532 Office Action mailed Jun. 24, 2014.
Office Action mailed Mar. 12, 2014 in U.S. Appl. No. 13/707,551.
Office Action mailed Apr. 7, 2014 in U.S. Appl. No. 13/681,141.
U.S. Office Action dated Mar. 4, 2015 in U.S. Appl. No. 13/707,534.
U.S. Office Action dated Mar. 24, 2015 in U.S. Appl. No. 13/707,551.
U.S. Office Action dated Feb. 19, 2015 in U.S. Appl. No. 14/084,578.
U.S. Office Action dated Nov. 17, 2014 in U.S. Appl. No. 13/707,535.
U.S. Office Action dated Dec. 24, 2014 in U.S. Appl. No. 13/707,531.
U.S. Office Action dated Dec. 10, 2014 in U.S. Appl. No. 13/707,551.
U.S. Office Action dated Jan. 22, 2015 in U.S. Appl. No. 13/707,539.
U.S. Office Action dated Jan. 22, 2015 in U.S. Appl. No. 14/059,041.
Raza, Syed Numan, "LTE Performance Study," Master of Science Thesis, Feb. 9, 2012.
Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Appl. No. 14/520,020, filed Oct. 21, 2014.
U.S. Office Action dated Jul. 20, 2015 in U.S. Appl. No. 13/707,534.
U.S. Office Action dated May 12, 2015 in U.S. Appl. No. 13/707,535.
U.S. Office Action dated Jul. 9, 2015 in U.S. Appl. No. 13/707,531.
U.S. Office Action dated Jun. 17, 2015 in U.S. Appl. No. 14/084,578.
U.S. Office Action dated May 11, 2015 in U.S. Appl. No. 14/064,329.
U.S. Office Action dated May 19, 2015 in U.S. Appl. No. 14/035,584.
U.S. Office Action dated Sep. 17, 2015 in U.S. Appl. No. 13/707,539.
U.S. Office Action dated Sep. 18, 2015 in U.S. Appl. No. 14/520,020.
U.S. Office Action dated Sep. 30, 2015 in U.S. Appl. No. 13/707,551.
U.S. Office Action dated Sep. 30, 2015 in U.S. Appl. No. 13/707,535.

(56) References Cited

OTHER PUBLICATIONS

U.S. Office Action dated Nov. 16, 2015 in U.S. Appl. No. 13/707,534.
U.S. Office Action dated Nov. 16, 2015 in U.S. Appl. No. 13/707,531.
U.S. Notice of Allowance dated Dec. 14, 2015 in U.S. Appl. No. 14/035,584.
U.S. Office Action mailed on Feb. 25, 2016 in U.S. Appl. No. 13/707,535.
U.S. Office Action mailed on Mar. 23, 2016 in U.S. Appl. No. 14/084,578.
Office Action mailed Apr. 14, 2016 in U.S. Appl. No. 13/707,551.

* cited by examiner

TRAFFIC STEERING ACROSS CELL-TYPES

TECHNICAL FIELD

The concepts and technologies disclosed herein generally relate to wireless telecommunications. More specifically, the concepts and technologies disclosed herein relate to traffic steering across cell-types.

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for traffic steering across cell-types. According to one aspect disclosed herein, a mobile device enables radio access network ("RAN") selection across multiple cell-types, including, but not limited to, macro cells, metro cells, femto cells, pico cells, and the like, based upon network conditions, local device information, and/or other information such as policies and user profiles. The local device information can include, but is not limited to, mobility state information, performance measurement information, battery utilization information, channel quality information, and user overrides.

According to another aspect disclosed herein, a mobile device includes a processor and a memory. The memory can include computer-executable instructions that, when executed by the processor, cause the mobile device to perform operations. The operations can include receiving cell-type information of a current camping cell on which the mobile device is currently camping, receiving cell-type information of neighbor cells to the current camping cell, and determining a mobility state of the mobile device. The operations can also include selecting a neighbor cell or the current camping cell as a target camping cell based upon the cell-type information of the current camping cell, the cell-type information of the neighbor cells, and the mobility state information.

In some embodiments, the cell-type information is received from the current camping cell in a cell broadcast message. The cell-type information can be included in a new field of an existing cell broadcast message. Alternatively, the cell-type information can be included in a new cell broadcast message.

In addition to the cell-type information, a cell broadcast message can include cell load information for the current camping cell and one or more of the neighbor cells. The mobile device can select a neighbor cell further based upon this cell load information.

In some embodiments, the cell-type information of the current camping cell identifies the current camping cell as being of a macro cell-type, the cell-type information of a first neighbor cell identifies the first neighbor cell as being of a metro cell-type, the cell-type information of a second neighbor cell identifies the second neighbor cell as being of a macro cell-type, and the mobility state information indicates that the mobile device is moving at speed that is not conducive to the metro cell-type. In these embodiments, the mobile device can select the second neighbor cell as the target camping cell based upon the speed of the mobile device not being conducive to the metro cell-type of the first neighbor cell.

In some embodiments, the cell-type information of the current camping cell identifies the current camping cell as being of a macro cell-type, the cell-type information of a first neighbor cell identifies the first neighbor cell as being of a metro cell-type, the cell-type information of a second neighbor cell identifies the second neighbor cell as being of a macro cell-type, and the mobility state information indicates that the mobile device is moving at speed that is conducive to the metro cell-type. In these embodiments, the mobile device can select the first neighbor cell as the target camping cell based upon the speed of the mobile device being conducive to the metro cell-type of the first neighbor cell.

In some embodiments, the operations also include generating feedback regarding a preferred cell of the neighbor cells, and sending the feedback to the current camping cell so as to provide a load balancing recommendation.

According to another aspect disclosed herein, a mobile device includes a processor and a memory. The memory can include computer-executable instructions that, when executed by the processor, cause the mobile device to perform operations. The operations can include receiving cell-type information of a current serving cell, receiving cell-type information of neighbor cells to the current serving cell, and determining a mobility state of the mobile device. The operations can also include selecting a neighbor cell or the current serving cell as a target serving cell based upon the cell-type information of the current serving cell, the cell-type information of the neighbor cells, and the mobility state information.

In some embodiments, the cell-type information is received from the current camping cell in a cell broadcast message. The cell-type information can be included in a new field of an existing cell broadcast message. Alternatively, the cell-type information can be included in a new cell broadcast message.

In addition to the cell-type information, a cell broadcast message can include cell load information for the current camping cell and one or more of the neighbor cells. The mobile device can select a neighbor cell further based upon this cell load information.

In some embodiments, the cell-type information of the current serving cell identifies the current serving cell as being of a macro cell-type, the cell-type information of a first neighbor cell identifies the first neighbor cell as being of a metro cell-type, the cell-type information of a second neighbor cell identifies the second neighbor cell as being of a macro cell-type, and the mobility state information indicates that the mobile device is moving at speed that is not conducive to the metro cell-type. In these embodiments, the mobile device can select the second neighbor cell as the target serving cell based upon the speed of the mobile device not being conducive to the metro cell-type of the first neighbor cell.

In some embodiments, the cell-type information of the current serving cell identifies the current serving cell as being of a macro cell-type, the cell-type information of a first neighbor cell identifies the first neighbor cell as being of a metro cell-type, the cell-type information of a second neighbor cell identifies the second neighbor cell as being of a macro cell-type, and the mobility state information indicates that the mobile device is moving at speed that is conducive to the metro cell-type. In these embodiments, the mobile device can select the first neighbor cell as the target serving cell based upon the speed of the mobile device being conducive to the metro cell-type of the first neighbor cell.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
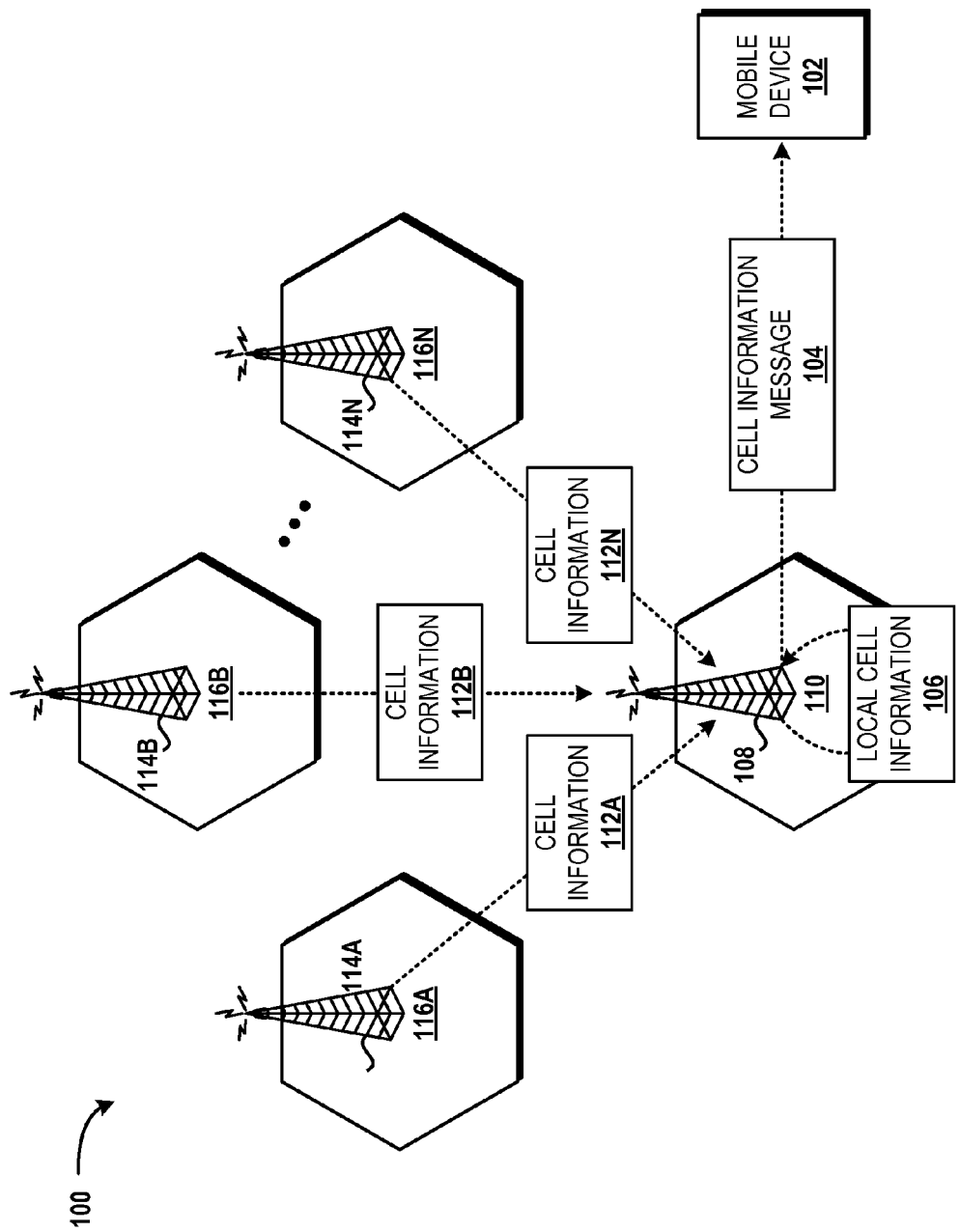
FIG. 1 is a block diagram illustrating aspects of an illustrative operating environment for various concepts disclosed herein.

Concepts and technologies are described herein for traffic steering across cell-types. According to one aspect disclosed herein, a mobile device enables radio access network ("RAN") selection across multiple cell-types, including, but not limited to, macro cells, metro cells, femto cells, and the like, based upon network conditions, local device information, and/or other information such as policies and user profiles. The local device information can include, but is not limited to, mobility state information, performance measurement information, battery utilization information, channel quality information, and user overrides.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across cell-types will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is configured to connect to and communicate with one or more radio access networks ("RANs") for voice and/or data communications between the mobile device 102 and one or more other mobile devices, computers, servers, networking devices, and/or other networks (not shown). A RAN can include one or more cells having the same or different cells sizes, which may be represented by cell types. As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile device 102, can connect to a network. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from a network.

A cell-type can be associated with certain dimensional characteristics that define the effective radio range of a cell. A cell-type can additionally represent the radio access technology ("RAT") utilized by a cell. Cell types can include, but are not limited to, a macro cell-type, a metro cell-type, a femto cell-type, a pico cell-type, or a micro cell-type. Alternatively, cell-types can be proprietary, temporary, or ad-hoc in nature. An ad-hoc cell-type, for example, can include a mobile device, such as the mobile device 102, functioning as a "hotspot" for facilitating connectivity for other devices to another potentially larger cell.

The mobile device 102 may be a cellular phone, a feature phone, a smartphone, a mobile computing device, a tablet computing device, a portable television, a portable video game console, or any other computing device that is configured to connect to and communicate with one or more RANs via one or more radio access components. In some embodiments, the mobile device 102 includes an integrated or external radio access component that facilitates wireless communication with one or more RANs. The radio access component may be a cellular telephone that is in wired or wireless communication with the mobile device 102 to facilitate a tethered data connection to one or more RANs. Alternatively, the access component includes a wireless transceiver configured to send data to and receive data from one or more RANs and a universal serial bus ("USB") or another communication interface for connection to the mobile device 102 so as to enable tethering. In any case, the mobile device 102 can wirelessly communicate with one or more RANs over a radio/air interface in accordance with one or more RATs. The mobile device 102 may also initiate, receive, and/or maintain voice calls with one or more other voice-enabled telecommunications devices such as other mobile devices or landline devices (not shown). The mobile device 102 may also exchange Short Message Service ("SMS") messages, Multimedia Message Service ("MMS") messages, email, and/or other messages with other devices (not shown).

As used herein, a RAN may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and/or the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

A RAN can be part of one or more mobile telecommunications networks. As used herein, a mobile telecommunications network includes one or more RANs and a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices of mobile device 102. Moreover, a mobile telecommunications network can provide a connection to the Internet or other WAN so that the mobile device 102 can access Internet content such as Websites, streaming media, online video games, downloadable content, and the like.

The mobile device 102 is configured to receive a cell information message 104, which can include local cell information 106 collected by a base station 108 that is operating within a cell 110 of a RAN. The local cell information 106 can include cell-type information of the cell 110. The local cell information 106 can also include cell load information of the cell 110. The cell information message 104 can additionally include at least a portion of cell information 112A-112N (hereinafter, at times, referred to herein collectively or generically as "cell information 112") collected by one or more other base stations 114A-114N (hereinafter, at times, referred to herein collectively or generically as "other base stations 114") that operate in corresponding cells 116A-116N (hereinafter, at times, referred to herein collectively or generically as "other cells 116") of the same RAN as the cell 110 or one or more other RANs. The cell information 112 can include cell-type information of one or more of the other cells 116. The cell information 112 can also include cell load information of one or more of the other cells 116.

The other cells 116 may be neighbor cells to the cell 110, and one or more of the other cells 116 may overlap with the cell 110 and/or each other. Moreover, the cell 110 and the other cells 116 may be of any cell-type or any combination of cell types. As the mobile device 102 moves, the mobile device 102 can select one of the other cells 116 or the cell 110 as a target cell camping cell or target serving cell depending upon the mode of operation of the mobile device 102 at the time of selection.

The mobile device 102 can operate in an idle mode or a connected mode. When the mobile device 102 is in the idle mode, the cell 110 is a current camping cell for the mobile device 102. In this case, the other cells 116 may be considered by the mobile device 102 for selection as potential target camping cells. Alternatively, the cell 110 can be selected by the mobile device 102 as the target camping cell. Examples of the mobile device 102 operating in an idle mode are illustrated and described below with reference to FIGS. 3A-3B.

When the mobile device 102 is in the connected mode, the cell 110 is a current serving cell for the mobile device 102. In this case, the other cells 116 and/or the cell 110 can be considered by the mobile device 102 for selection as target serving cells, such as the target of a handover operation conducted while the mobile device 102 travels between cells during an active voice call or other communication. An example of the mobile device 102 operating in a connected mode is illustrated and described below with reference to FIG. 5.

The mobile device 102 utilizes information contained within the cell information message 104 at least in part to select a neighbor cell as the target camping or serving cell. The mobile device 102 can alternatively select the cell 110 as the target camping or target serving cell. The mobile device 102 can also utilize local device information such as, but not limited to, mobility state information, performance measurement information, battery utilization information, channel quality information, and/or a user override selection, in selecting the target camping or serving cell, as will be described in greater detail below with reference to FIG. 2.

Cell-type information can identify a cell as being of a particular cell type. The cell information message 104 can include an explicit specification of a cell-type of one or more cells. For example, the cell information message 104 may include text that explicitly names the cell-type for a given cell. As another example, the cell information message 104 may include a code or identifier by which the mobile device 102 can ascertain the cell-type of one or more cells. In this example, the mobile device 102 may have a table or other data structure by which to cross-reference cell-type codes or identifiers with cell-types.

The cell information message 104 can include any message that is capable of being sent to the mobile device 102 from a base station over a radio/air interface. The cell information message 104 can be sent to the mobile device 102 using any physical, transport, and/or logical channels. These channel types are generally known and therefore are not described in greater detail herein.

In some embodiments, the cell information message 104 is a System Information Block ("SIB"). In some other embodiments, the cell information message 104 is included in a SIB that contains other information. The SIB may be a new SIB configured to include cell-type information for one or more cells. Alternatively, the SIB may be an existing SIB that has been modified to include cell-type information for one or more cells.

In some embodiments, the cell information message 104 is an SMS message. In these embodiments, the base station 108 can send the cell information message 104 to the mobile device 102, and potentially to one or more other mobile devices that are connected to the base station 108 or otherwise operating within the cell 110, via SMS Cell Broadcast ("SMS-CB"). Alternatively, in these embodiments, the base station 108 can send the cell information message 104 to the mobile device 102 via SMS Peer-to-Peer ("SMPP"). The cell information message 104 may be sent to the mobile device 102 via other messaging services including, but not limited to, MMS, Wireless Application Protocol ("WAP") push message, Unstructured Supplementary Service Data ("USSD"), or any combination thereof. It should be understood that network elements, such as Short Message Service Centers ("SMSCs"), Multimedia Message Service Centers ("MMSCs"), WAP servers, USSD servers, and the like, that support the aforementioned messaging services are not illustrated merely for ease of description.

Cell-type information can be conveyed to the mobile device 102 using existing information such as, but not limited to, Location Area Identity ("LAI"), Cell Identity ("CID"), Routing Area Identity ("RAI"), Tracking Area Identity ("TAI"), Physical Cell Identity ("PCI"), or some combination thereof. In these embodiments, the mobile device 102 can use one of these identities, or some combination thereof, to determine the cell-type of one or more cells, for example, utilizing a table or other data structure stored on or otherwise accessible by the mobile device 102.

A cell-type can be associated with a particular identity or range of identities of one or more of the above identities. For example, an ID range of 100-49,999 may be assigned to macro cells, an ID range of 50,000-200,000 may be assigned to metro cells, and so on. The mobile device 102 can be configured to ascertain LAI, CID, RAI, TAI, or some combination thereof, and determine a cell-type for the cell(s) associated with one or more of these IDs.

In the illustrated example, the mobile device 102 receives the cell information message 104 from the base station 108. Alternatively or additionally, the mobile device 102 can receive one or more cell information messages from any number of base stations such as one or more of the other base stations 114. Also in the illustrated example, the cell information message 104 includes the local cell information 106 and the cell information 112. However, it is contemplated that the cell information message 104 may include only the local cell information 106, only the cell information 112A, only the cell information 112B, only the cell information 112N, or any combination thereof.

In some embodiments, the base station 108 learns cell-type information and/or load information from one or more neighbor base stations, which may include one or more of the other base stations 114. The base station 108 may learn cell-type information and/or the load information via a self-organizing network or self-optimizing network feature such as provided by $3^{rd}$ Generation Partnership Project ("3GPP") and/or New Generation Mobile Networks ("NGMN"). In particular, the base station 108 can utilize the Automatic Neighbor Relation ("ANR") detection feature of LTE to detect one or more of the other base stations 114 and collect the cell information 112 therefrom. Other mechanisms by which the base station 108 can learn load information of one or more neighboring cells are contemplated.

In some embodiments, load information includes historic load information. Historic load information is used herein to describe load information obtained based upon load experienced by the base station 108 and/or one or more of the other base stations 114 in the past or otherwise in non-real-time. In some embodiments, historic load information is utilized by the mobile device 102 to identify one or more load trends over a specified period of time. This trending load information can be useful to the mobile device 102 to predict times during which load is favorable or not to support communications between the mobile device 102 and one or more cells.

In some embodiments, load information additionally or alternatively includes current load information. Current load information is used herein to describe load information that is obtained based upon a load experienced by the base station 108 and/or one or more of the other base stations 114 in real-time or near real-time. Real-time, in this context, is the actual time during which a load is experienced by the base station 108 and/or one or more of the other base stations 114. Near real-time, in this context, is the actual time during which a network load is experienced by the base station 108 and/or one or more of the other base stations 114 plus a delay on the order of microseconds or milliseconds, for example.

What constitutes near-real time load information versus historic load information can be defined by a service provider providing service via the base station 108 and/or one or more of the other base stations 114. It should be understood that real-time load information associated with a real-time load of the base station 108 and/or one or more of the other base stations 114, and near real-time network load information associated with a near real-time network load of the base station 108 and/or one or more of the other base stations 114 might be received by the mobile device 102 with delay caused by latency and/or other network phenomena. Moreover, this delay may increase with the additional time needed to generate the cell information message 104 that includes the local cell information 106 and/or the load information, and send the cell information message 104 to the mobile device 102.

In some embodiments, load information includes a number of active devices (e.g., devices currently engaged in a call or data session). In some other embodiments, load information includes a number of idle devices (e.g., devices currently camped on a given cell). It is contemplated that load information can include both a number of active devices and a number of idle devices. In other words, load information can include active load information and idle load information. The mobile device 102 can utilize the active load information and/or the idle load information for selecting a target camping cell or selecting a target serving cell.

It should be understood that some implementations of the operating environment 100 may include additional functionality or include less functionality than described above. Thus, the illustrated embodiment should be understood as being illustrative, and should not be construed as being limiting in any way.

Figure 2:
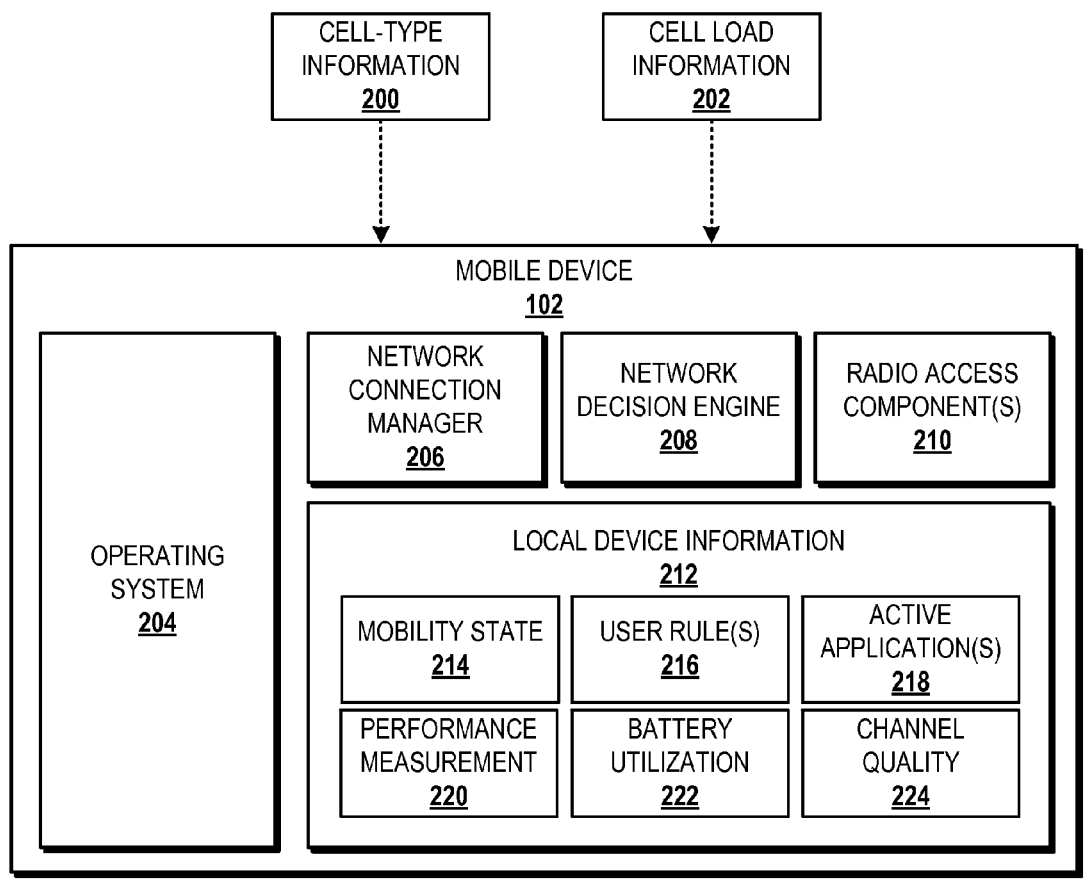
FIG. 2 is a block diagram illustrating aspects of a mobile device configured to select a cell based upon cell-type and other information, according to an illustrative embodiment.

Turning now to FIG. 2, a block diagram illustrating additional aspects of the mobile device 102 will be described, according to an illustrative embodiment. In the illustrated embodiment, the mobile device 102 is configured to receive cell-type information 200 and cell load information 202, and utilize at least some of this information to determine to which cell the mobile device 102 should connect. The cell-type information 200 can include, for example, the cell-type of one or more cells, such as the cell 110 and/or one or more of the other cells 116 shown in FIG. 1. The cell load information 202 can include, for example, the cell load of one or more cells, such as the cell 110 and/or one or more of the other cells 116.

The illustrated mobile device 102 also includes an operating system 204, a network connection manager 206, a network decision engine 208, one or more radio access components 210, and local device information 212. The operating system 204 is a program for controlling the operation of the mobile device 102. The operating system 204 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The network connection manager 206 can be configured to manage all or a portion of the network connections available to the mobile device 102 at a given time, including, for example, connections established via one or more one or more cellular radios of the mobile device 102 such as one or more of the radio access components 210. In some embodiments, the network connection manager 206 is included as part of the operating system 204 and/or another application stored on the mobile device 102 such as the network decision engine 208.

The network decision engine 208 utilizes the cell-type information 200, the load information 202, the local device information 212, or any combination thereof, to make a determination as to which cell the mobile device 102 should select as the target camping cell or target serving cell. In some embodiments, the network decision engine 208 is an application program that includes computer-executable instructions that, when executed by one or more processors of the mobile device 102, cause the mobile device 102 to analyze the cell-type information 200, the load information 202, and the local device information 212, alone or in any combination to select a cell, and to instruct the mobile device 102, and more particularly, the network connection manager 206, to establish communication with a base station operating within the selected cell.

In some embodiments, the network decision engine 208 utilizes additional information to select a cell. This information can include, but is not limited to, one or more policies and/or one or more user profiles. As used herein, the term "policy" refers to one or more settings, one or more configurations, one or more rules, and/or the like that define, at least in part, one or more courses or methods of action in light of one or more conditions to be used in a determination made by the mobile device 102 regarding to which cell the mobile device 102 should connect. In some embodiments, a policy includes one or more rules that specify one or more if-then conditions by which to handle a particular situation, such as redirecting network traffic based upon load experienced by the base station 108 and/or one or more of the other base stations 114 and that is reported to the mobile device 102 in the cell information message 104. In some other embodiments, a policy includes one or more matrices of cause and effect conditions, tables of actions, or the like for responding to or otherwise dealing with certain stimuli, such as network conditions evidenced by the local cell information 106, the cell information 112, and/or other stimuli.

As used herein, the term "user profile" refers to a collection of data associated with a user that accesses one or more RANs via a device such as the mobile device 102. A user in this context refers to an individual or other entity. A user profile can define information regarding a service agreement between a user and one or more service providers that provide a service, at least in part, via one or more RANs. The service agreement may include terms of service for pre-paid and/or post-paid service. The service agreement may include terms of roaming agreements between two or more mobile telecommunications carriers. The service agreement may define a service tier for the user. A service tier may establish a priority for a user in regard to utilizing network resources to connect to one or more RANs via the mobile device 102.

The illustrated local device information 212 includes mobility state information 214, one or more user rules 216, one or more active applications 218, performance measurement information 220, battery utilization information 222, and channel quality information 224. These types of local device information are merely illustrative of some contemplated information that may be used in accordance with various embodiments of the concepts and technologies described herein for selecting a cell and therefore should not be construed as being limiting in any way.

The mobility state information 214 can include the speed at which the mobile device 102 is currently moving, a movement pattern of the mobile device 102, and/or any other information associated with movement or non-movement of the mobile device 102. The mobility state information 214 may be obtained by an accelerometer, Global Positioning System ("GPS") component, and/or other motion sensor or component of the mobile device 102. The mobility state information 214 can be utilized by the network decision engine 208 to determine if it is appropriate for the mobile device 102 to connect to a network given the movement or non-movement of the mobile device 102. For example, if the mobility state information 214 indicates that the mobile device 102 is moving at 60 miles per hour and a metro cell is available to the mobile device 102, the network decision engine 208 can determine to forgo connecting to the metro cell based upon the relatively fast movement of the mobile device 102 and the prediction that the mobile device 102 will not be within range of a base station operating within the metro cell for a sufficient amount of time to handle voice and/or data communications between the mobile device 102 and the metro cell. Alternatively, for example, if the mobility state information 214 indicates that the mobile device 102 is stationary and a metro cell is available to the mobile device 102, the device-based network decision engine 208 can determine to connect to the metro cell based upon the stationary state of the mobile device 102 and the prediction that the mobile device 102 will be within range of the metro cell for a sufficient amount of time to handle voice and/or data communications between the mobile device 102 and the metro cell.

The user rule(s) 216 can include rules specified by or for a user of the mobile device 102 regarding cell selections. For example, a user rule may specify an override selection of a cell or a particular cell-type that should be selected if the particular cell or cell-type is available. An override selection can be conditional. In some embodiments, the user rule(s) 216 are overridden by one or more policies.

The active application(s) 218 can include an indication of one or more applications that are currently utilizing processing and/or memory resources of the mobile device 102. In some embodiments, information regarding the active application(s) 218 is received by the network decision engine 208 from the operating system 204, and more particularly, a resource management function of the operating system 204. The network decision engine 208 can utilize the active application(s) 218 to select a cell within a network that is capable of voice and/or data communications originating from or directed to the active application(s) 218. For example, if a video streaming application is active on the mobile device 102, the network decision engine 208 can determine to select a cell within a network that has sufficient bandwidth resources to support streaming video to the mobile device 102.

The performance measurement information 220 can include round-trip time ("RTT"), throughput, latency, and/or other performance measurements obtained by the mobile device 102. In some embodiments, the mobile device 102 is configured to perform one or more tests to obtain the performance measurement information 220. The tests may be performed by standalone test applications executing on the mobile device 102, the operating system 204, the network decision engine 208, and/or the network connection manager 206. By way of example and not limitation, illustrative tests include throughput tests, latency tests, call tests, SMS tests, multiple radio access bearer ("mRAB") tests (e.g., simultaneous voice and data tests), voice over Internet protocol ("VoIP"), video mean opinion score ("MOS"), or idle tests.

The battery utilization information 222 can include information such as, but not limited to, a current, a voltage, a temperature, a percentage of battery used, a percentage of battery remaining, a battery condition, a remaining time, and a remaining capacity (e.g., in watt hours). In some embodiments, the battery utilization information 222 is obtained from a battery gauge of the mobile device 102 that is configured to measure the effect of a battery's discharge rate, temperature, age, and/or other factor to predict the remaining life within a certain percentage of error.

The channel quality information 224 can include a channel quality indicator ("CQI") or other measurement that is indicative of the quality of a given channel over which the mobile device 102 can communicate. In some embodiments, a CQI is calculated based at least in part upon the channel quality information 224 includes a signal-to-noise ("SNR"), a signal-to-interference plus noise ratio ("SINR"), a signal-to-noise plus distortion ratio ("SNDR"), and/or the like for a given channel.

Figure 3A:
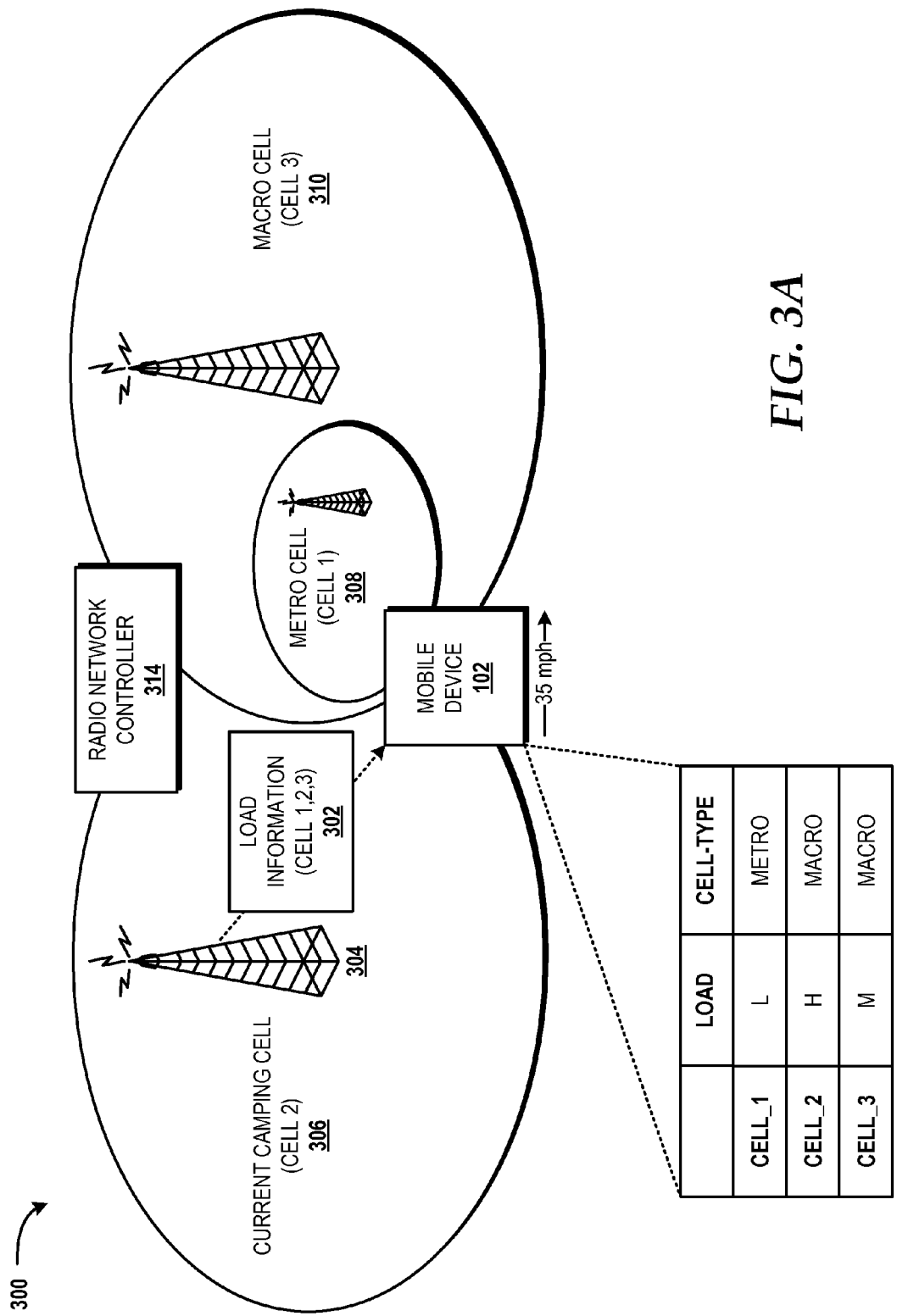
FIGS. 3A-3B are block diagrams illustrating example idle mode scenarios in which a mobile device can select a target camping cell based upon cell-type and other information, according to illustrative embodiments.
Figure 3B:
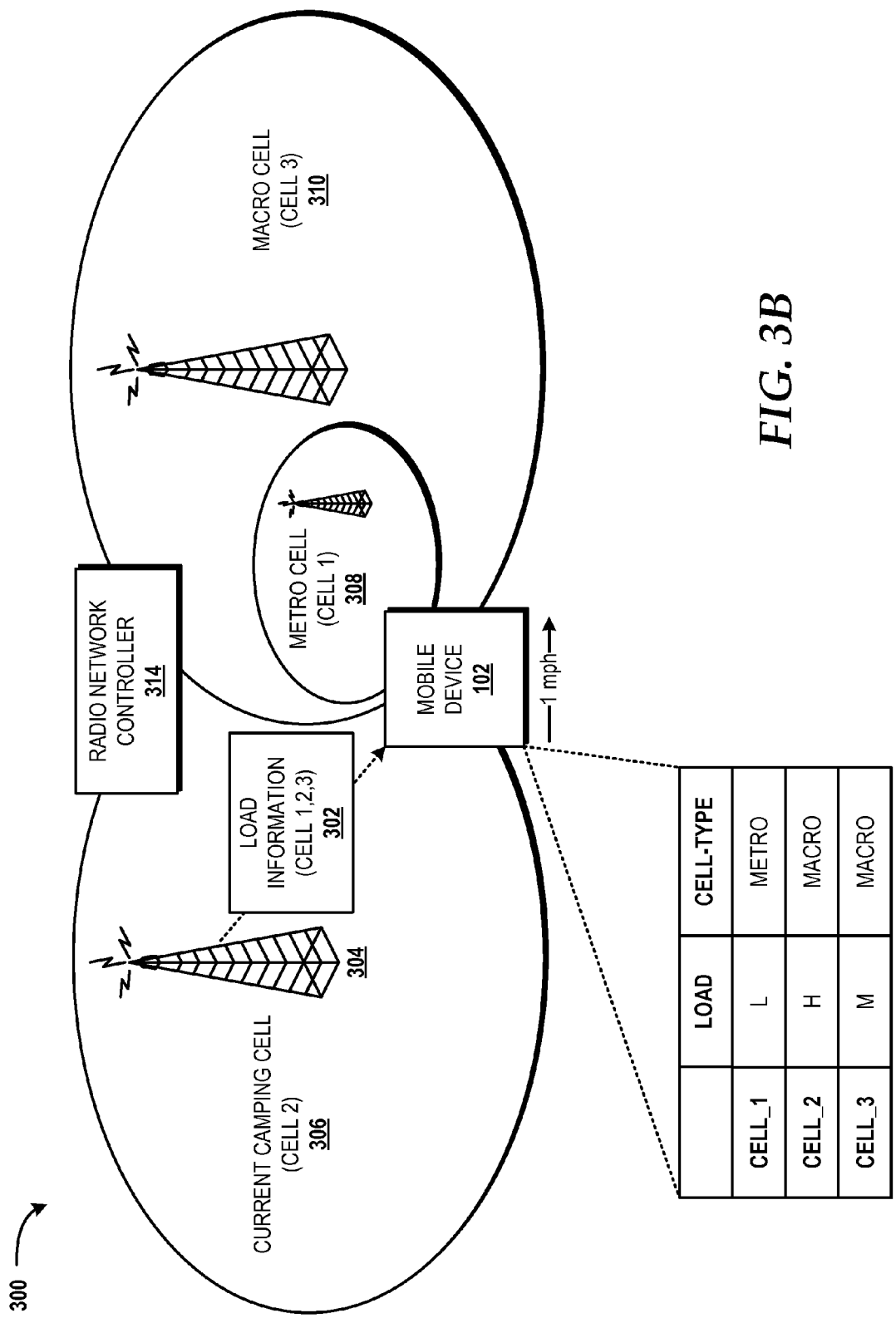

FIGS. 3A-3B are block diagrams illustrating example idle mode scenarios in which a mobile device can select a target camping cell based upon cell-type and other information, according to illustrative embodiments. Turning first to FIG. 3A, the mobile device 102 receives load information 302 from a current camping base station 304 operating within a current camping cell 306 ("cell 2") on which the mobile device 102 is currently camped. The load information 302 includes the cell load of the current camping cell 306 and two neighbor cells—a metro cell 308 ("cell 1") and a macro cell 310 ("cell 3"). In the illustrated example, the current camping cell 306, the metro cell 308, and the macro cell 310 are all being controlled by a radio network controller ("RNC") 314. In other implementations, the current camping cell 306, the metro cell 308, and the macro cell 310 may be controlled by any number of RNCs.

The mobile device 102 is moving from the current camping cell 306 towards the metro cell 308 and the macro cell 310 at 35 miles per hour. Since the mobile device 102 is moving at such speed and given the radio range provided by the metro cell-type, the mobile device 102 can determine that the metro cell 308 is not a good candidate for the target camping cell. The macro cell 310, on the other hand, has sufficient radio range as specified by its macro cell-type, and therefore the mobile device 102 can select the macro cell 310 as the targeted camping cell.

Turning now to FIG. 3B, the mobile device 102 is moving from the current camping cell 306 towards the metro cell 308 and the macro cell 310 at 1 mile per hour. Since the mobile device 102 is moving at such speed and given the radio range provided by the metro cell-type, the mobile device 102 can determine that the metro cell 308 is a good candidate for the target camping cell. The macro cell 310, on the other hand, has sufficient radio range as specified by its macro cell-type, but the load information 302 indicates the load of the metro cell 308 is low relative to its capacity whereas the load of the macro cell 310 is medium relative to its capacity. Therefore the mobile device 102 can select the metro cell 308 as the targeted camping cell. In this example, given the slow speed of the mobile device 102, the metro cell 308 or the macro cell 310 are qualified camping cell candidates, but the lower load of the metro cell 308 might facilitate a better overall user experience and so is selected.

Figure 4:
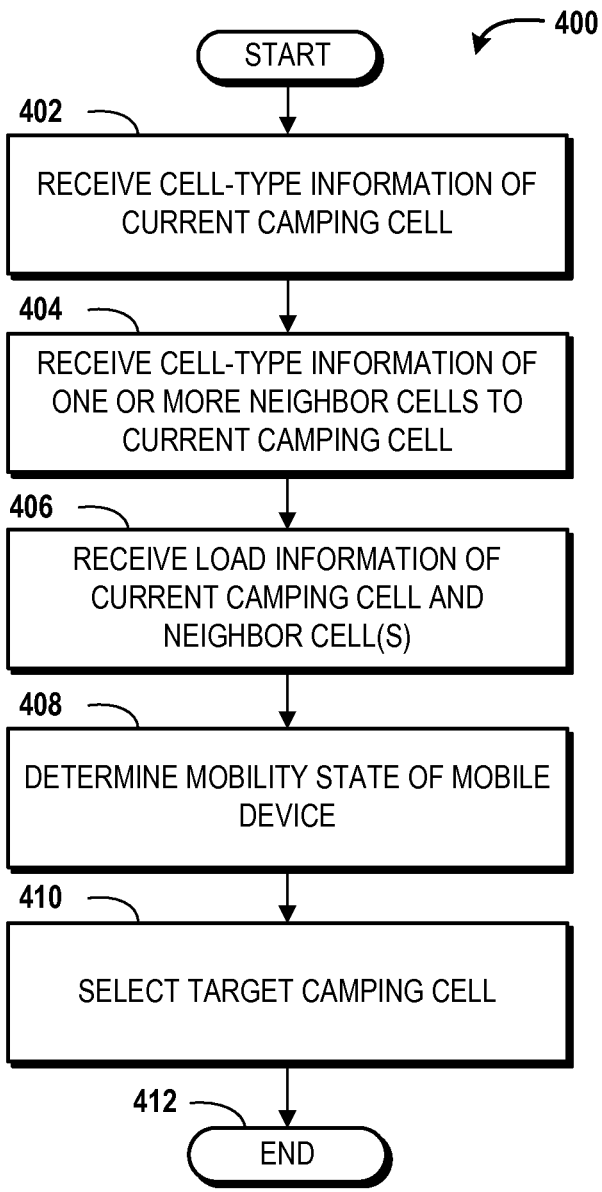
FIG. 4 is a flow diagram illustrating aspects of a method for selecting a target camping cell based upon cell-type and other information, according to an illustrative embodiment.

Turning now to FIG. 4, a flow diagram illustrating aspects of a method 400 for selecting a target camping cell based upon cell-type and other information will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like. As used herein, "cause a processor to perform operations" includes causing a processor of a computing system or computing device such as the mobile device 102, the base station 108, one or more of the other base stations 114, or other computing systems or devices described herein, to perform one or more operations of the operations and/or causing the processor to direct other components of the computing system or device to perform one or more of the operations.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 400 begins and proceeds to operation 402, wherein the mobile device 102 receives cell-type information of a cell on which the mobile device 102 is currently camping, or, in other words, the current camping cell. From operation 402, the method 400 proceeds to operation 404, wherein the mobile device 102 receives cell-type information of one or more neighbor cells to the current camping cell. From operation 404, the method 400 proceeds to operation 406, wherein the mobile device receives load information of the current camping cell and the neighbor cell(s).

From operation 406, the method 400 proceeds to operation 408, wherein the mobile device 102 determines a mobility state of the mobile device 102. From operation 408, the method 400 proceeds to operation 410, wherein the mobile device 102 selects a target camping cell based upon the cell-type information, the load information, and the mobility state of the mobile device 102. In some embodiments, the mobile device 102 selects the current camping cell as the target camping cell. In some other embodiments, the mobile device 102 selects a neighbor cell as the target camping cell. From operation 410, the method 400 proceeds to operation 412, wherein the method 400 may end.

Figure 5:
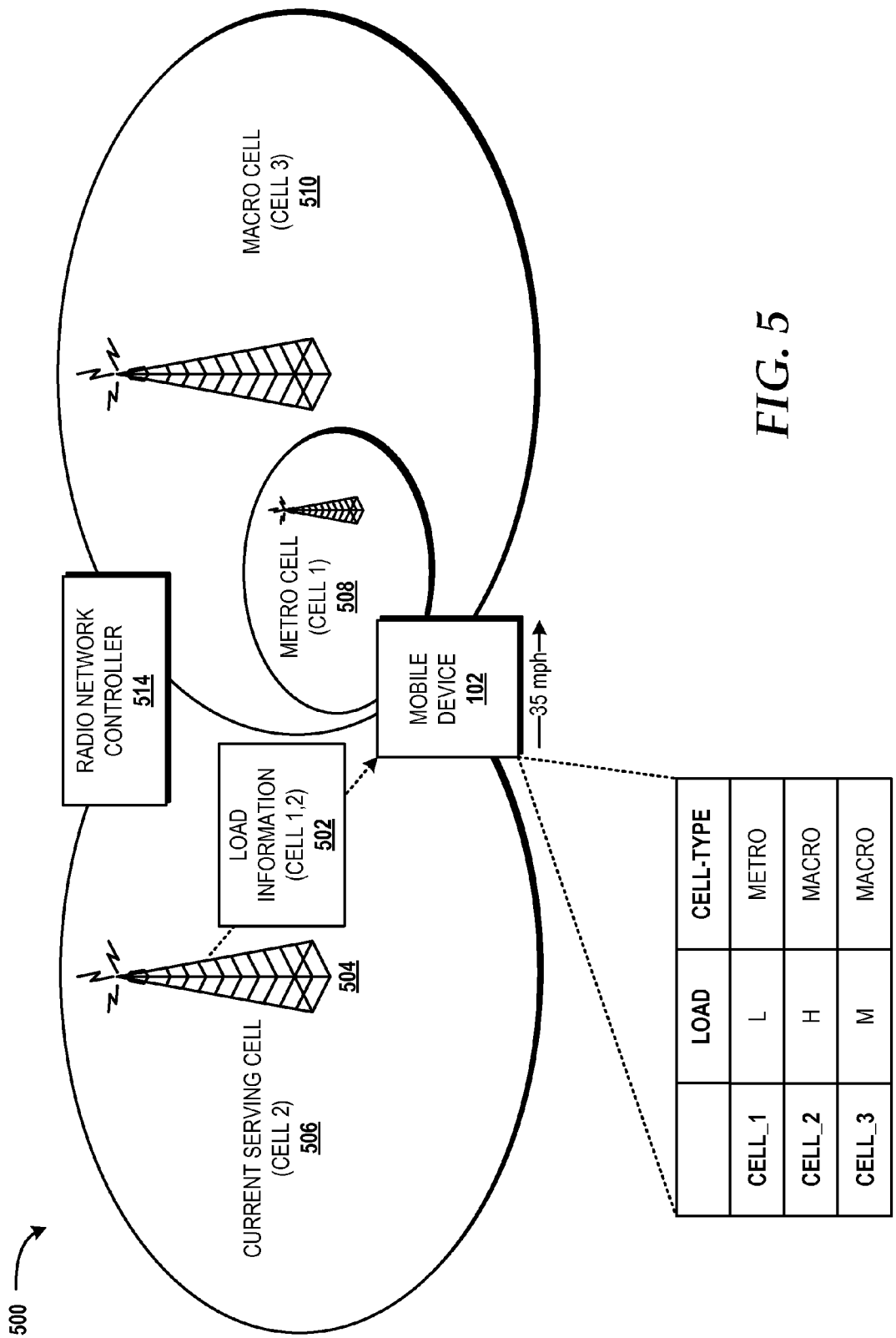
FIG. 5 is a block diagram illustrating an example connected mode scenario in which a mobile device can select a target serving cell based upon cell-type and other information, according to an illustrative embodiment.

Turning now to FIG. 5, a block diagram illustrating an example connected mode scenario in which a mobile device can select a target serving cell based upon cell-type and other information will be described, according to an illustrative embodiment. In the illustrated example, the mobile device 102 receives load information 502 from a current serving base station 504 operating within a current serving cell 506 ("cell 2") of the mobile device 102. The load information 502 includes the cell load of the current serving cell 506 and two neighbor cells—a metro cell 508 ("cell 1") and a macro cell 510 ("cell 3"). In the illustrated example, the current serving cell 506, the metro cell 508, and the macro cell 510 are all being controlled by an RNC 514. In other implementations, the current serving cell 506, the metro cell 508, and the macro cell 510 may be controlled by any number of RNCs.

The mobile device 102 is moving from the current serving cell 506 towards the metro cell 508 and the macro cell 510 at 35 miles per hour. Since the mobile device 102 is moving at such speed and given the radio range provided by the metro cell-type, the mobile device 102 can determine that the metro cell 508 is not a good candidate for the target serving cell. The macro cell 510, on the other hand, has sufficient radio range as specified by its macro cell-type, and therefore the mobile device 102 can select the macro cell 510 as the targeted serving cell.

Handover from a current serving cell to a target serving cell is typically controlled by the network (e.g., by the RNC 514), but the mobile device 102 can determine not to measure and report on one or more cells that the mobile device 102 has determined to be unsuitable as the target serving cell. In the example shown in FIG. 5, the metro cell 508 is determined to be unsuitable due to its cell type and the relatively high speed of movement of the mobile device 102 through the metro cell 508. As a result, the RNC 514 and/or other network component may not include omitted neighbor cells in the handover decision. The decision process in the mobile device 102 can be a function of the network decision engine 208 and/or the network connection manager 206. Such decision rules can be stored in the mobile device 102 in association with the network decision engine 208 and/or the network connection manager 206. In some embodiments, the decision rules can be updated by an operator via over-the-air ("OTA") updates in the form of wireless application protocol ("WAP") push, SMS, USSD, or other OTA methods.

Figure 6:
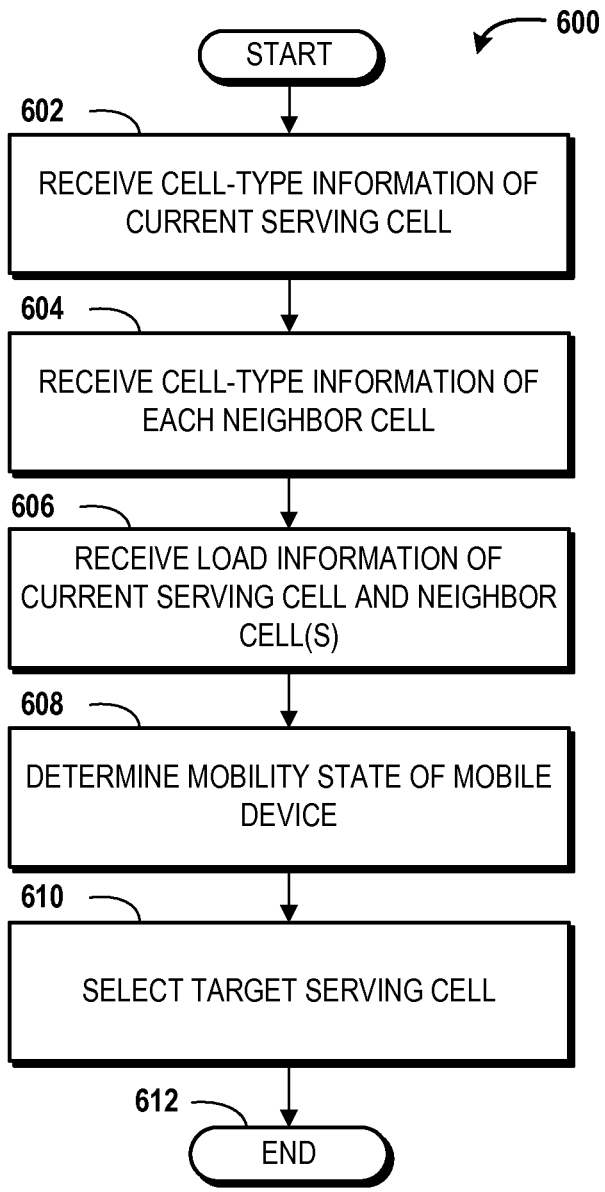
FIG. 6 is a flow diagram illustrating aspects of a method for selecting a target serving cell based upon cell-type and other information, according to an illustrative embodiment.

Turning now to FIG. 6, a flow diagram illustrating aspects of a method 600 for selecting a target serving cell based upon cell-type and other information will be described, according to an illustrative embodiment. The method 600 is described from the perspective of the mobile device 102. The method 600 begins and proceeds to operation 602, wherein the mobile device 102 receives cell-type information of a current serving cell to the mobile device 102. From operation 602, the method 600 proceeds to operation 604, wherein the mobile device 102 receives cell-type information of one or more neighbor cells to the current serving cell. From operation 604, the method 600 proceeds to operation 606, wherein the mobile device 102 receives load information of the current serving cell and the neighbor cell(s).

From operation 606, the method 600 proceeds to operation 608, wherein the mobile device 102 determines a mobility state of the mobile device 102. From operation 608, the method 600 proceeds to operation 610, wherein the mobile device 102 selects a target serving cell based upon the cell-type information, the load information, and the mobility state of the mobile device 102. In some embodiments, the mobile device 102 selects the current serving cell as the target serving cell. In some other embodiments, the mobile device 102 selects a neighbor cell as the target serving cell. From operation 610, the method 600 proceeds to operation 612, wherein the method 600 may end.

Figure 7:
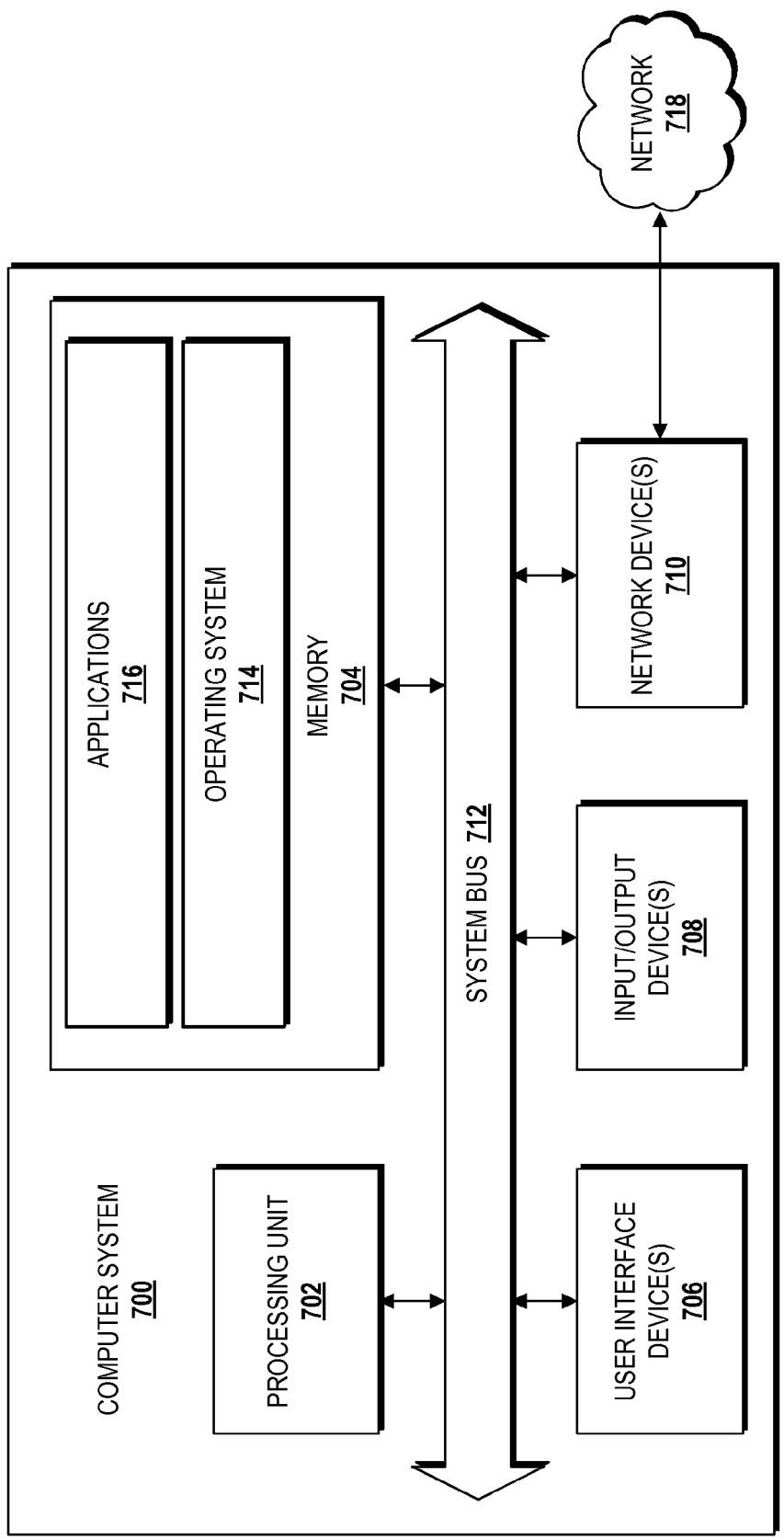
FIG. 7 is a block diagram illustrating an example computer system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the base station 108 and/or one or more of the other base stations 114 is configured, at least in part, like the computer system 700. It should be understood, however, that the base station 108 and/or one or more of the other base stations 114 may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more applications 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless PAN ("WPAN") such as BLUETOOTH, or a wireless MAN ("WMAN"). Alternatively, the network 718 may be a wired network such as, but not limited to, a WAN such as the Internet, a LAN such as the Ethernet, a wired PAN, or a wired MAN.

The network 718 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 718. Therefore, the embodiments presented herein should not be construed as being limiting to a particular mobile telecommunications technology and/or standards utilizing such technologies.

Figure 8:
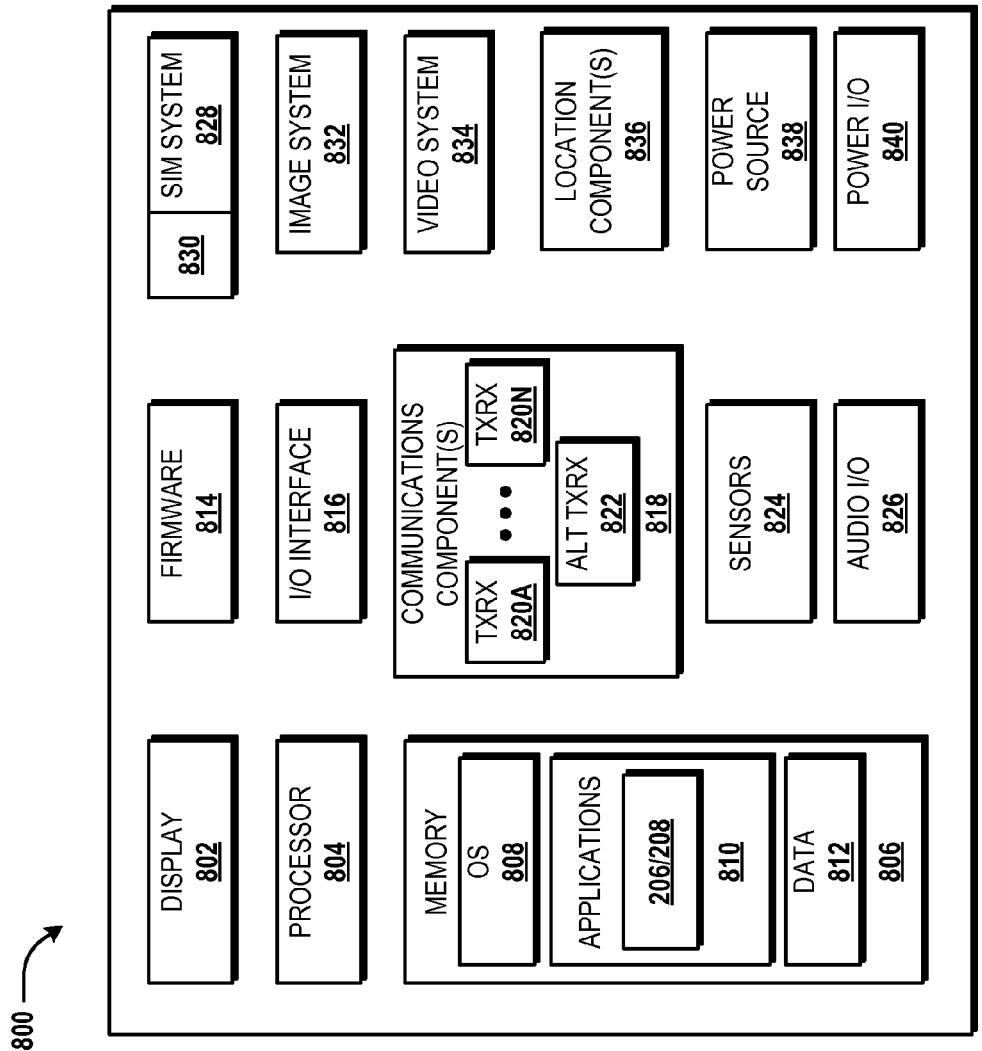
FIG. 8 is a block diagram illustrating an example mobile device capable of implementing aspects of the embodiments disclosed herein.

Turning now to FIG. 8, an illustrative mobile device 800 and components thereof will be described. In some embodiments, the mobile device 102 described above with reference to FIGS. 1 and 2 can be configured as and/or can have an architecture similar or identical to the mobile device 800 described herein in FIG. 8. It should be understood, however, that the mobile device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, which may include the network connection manager 206, the network decision engine 208, other computer-executable instructions stored in the memory 806, or the like. In some embodiments, the applications 810 also can include a UI application (not illustrated in FIG. 8).

The UI application can interface with the operating system 808, such as the operating system 204 shown in FIG. 2, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in answering/initiating calls, data communications, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, cell-type information and/or load information received in a one or more cell information messages, such as the local cell information 106, the cell information 112, the cell-type information 200, or the cell load information 202.

According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the RANs described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like.

The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for traffic steering across cell-types have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting.

Various modifications and changes may be made to the subject matter described herein without following the example embodiments and applications illustrated and described, and without departing from the true spirit and scope of the subject disclosure.

We claim:

1. A mobile device comprising:
a processor; and
a memory storing computer-executable instructions that, when executed by the processor, cause the processor to perform operations comprising
receiving a system information block comprising cell-type information of a current camping cell on which the mobile device is currently camping, first cell-type information of a first neighbor cell of a plurality of neighbor cells to the current camping cell, first cell load information of the first neighbor cell, second cell-type information of a second neighbor cell of the plurality of neighbor cells to the current camping cell, and second cell load information of the second neighbor cell, wherein the first cell-type information of the first neighbor cell is different from the second cell-type information of the second neighbor cell,
determining a mobility state of the mobile device,
determining, based at least upon the cell-type information of the current camping cell, the first cell-type information of the first neighbor cell, the second cell-type information of the second neighbor cell, and the mobility state of the mobile device, that the first neighbor cell and the second neighbor cell are both qualified to be a target camping cell for the mobile device, and
after determining that the first neighbor cell and the second neighbor cell are both qualified to be the target camping cell for the mobile device, selecting, based at least on the first cell load information of the first neighbor cell as compared with the second cell load information of the second neighbor cell, the first neighbor cell over the second neighbor cell as the target camping cell for the mobile device.

2. The mobile device of claim 1, wherein the system information block comprises an existing system information block that has been modified to include the cell-type information of the current camping cell, the first cell-type information of the first neighbor cell, and the second cell-type information of the second neighbor cell.

3. The mobile device of claim 1, wherein the system information block comprises a new system information block.

4. The mobile device of claim 1, wherein the operations further comprise receiving an operator policy, and wherein selecting the first neighbor cell over the second neighbor cell as the target camping cell for the mobile device is further based on the operator policy.

5. The mobile device of claim 1, wherein the operations further comprise receiving local device information comprising user rules associated with a user of the mobile device, wherein the user rules comprise an override selection of a particular cell-type to be selected if the particular cell-type is available, and wherein selecting the first neighbor cell over the second neighbor cell as the target camping cell for the mobile device is further based on the user rules.

6. The mobile device of claim 1, wherein:
the cell-type information of the current camping cell identifies the current camping cell as being of a macro cell-type;
the first cell-type information of the first neighbor cell of the plurality of neighbor cells identifies the first neighbor cell as being of a metro cell-type;
the second cell-type information of the second neighbor cell of the plurality of neighbor cells identifies the second neighbor cell as being of the macro cell-type;
the mobility state indicates that the mobile device is moving at a speed that is conducive to both the metro cell-type and the macro cell-type; and
selecting the first neighbor cell over the second neighbor cell as the target camping cell is based upon the speed of the mobile device being conducive to the metro cell-type of the first neighbor cell and the first cell load information of the first neighbor cell indicating that a first cell load of the first neighbor cell is lower, relative to a capacity of the first neighbor cell, than a second cell load of the second neighbor cell.

7. The mobile device of claim 1, wherein the operations further comprise receiving local device information comprising an indication of an application utilizing at least one of the processor or the memory of the mobile device, and wherein selecting the first neighbor cell over the second neighbor cell as the target camping cell for the mobile device is further based on the indication of the application utilizing the at least one of the processor or the memory of the mobile device.

8. The mobile device of claim 1, wherein the operations further comprise:
generating feedback regarding a preferred cell of the plurality of neighbor cells; and
sending the feedback to the current camping cell to provide a load balancing recommendation.

9. A mobile device comprising:
a processor; and
a memory storing computer-executable instructions that, when executed by the processor, cause the processor to perform operations comprising
receiving a system information block comprising cell-type information of a current serving cell to the mobile device, first cell-type information of a first neighbor cell of a plurality of neighbor cells to the current serving cell, first cell load information of the first neighbor cell, second cell-type information of a second neighbor cell of the plurality of neighbor cells to the current serving cell, and second cell load information of the second neighbor cell, wherein the first cell-type information of the first neighbor cell is different from the second cell-type information of the second neighbor cell,
determining a mobility state of the mobile device,
determining, based at least upon the cell-type information of the current serving cell, the first cell-type information of the first neighbor cell, the second cell-type information of the second neighbor cell, and the mobility state of the mobile device, that the first neighbor cell and the second neighbor cell are both qualified to be a target serving cell for the mobile device, and
after determining that the first neighbor cell and the second neighbor cell are both qualified to be the target serving cell for the mobile device, selecting, based at least on the first cell load information of the first neighbor cell as compared with the second cell load information of the second neighbor cell, the first neighbor cell over the second neighbor cell as the target serving cell for the mobile device.

10. The mobile device of claim 9, wherein the system information block comprises an existing system information block that has been modified to include the cell-type information of the current serving cell, the first cell-type information of the first neighbor cell, and the second cell-type information of the second neighbor cell.

11. The mobile device of claim 10, wherein the system information block comprises a new system information block.

12. The mobile device of claim 9, wherein the operations further comprise receiving an operator policy, and wherein selecting the first neighbor cell over the second neighbor cell as the target serving cell for the mobile device is further based on the operator policy.

13. The mobile device of claim 9, wherein the operations further comprise receiving local device information comprising user rules associated with a user of the mobile device, wherein the user rules comprise an override selection of a particular cell-type to be selected if the particular cell-type is available, and wherein selecting the first neighbor cell over the second neighbor cell as the target serving cell for the mobile device is further based on the user rules.

14. The mobile device of claim 9, wherein:
the cell-type information of the current serving cell identifies the current serving cell as being of a macro cell-type;
the first cell-type information of the first neighbor cell of the plurality of neighbor cells identifies the first neighbor cell as being of a metro cell-type;
the second cell-type information of the second neighbor cell of the plurality of neighbor cells identifies the second neighbor cell as being of the macro cell-type;
the mobility state indicates that the mobile device is moving at a speed that is conducive to both the metro cell-type and the macro cell-type; and
selecting the first neighbor cell over the second neighbor cell as the target serving cell is based upon the speed of the mobile device being conducive to the metro cell-type of the first neighbor cell and the first cell load information of the first neighbor cell indicating that a first cell load of the first neighbor cell is lower, relative to a capacity of the first neighbor cell, than a second cell load of the second neighbor cell.

15. The mobile device of claim 9, wherein the operations further comprise receiving local device information comprising an indication of an application utilizing at least one of the processor or the memory of the mobile device, and wherein selecting the first neighbor cell over the second neighbor cell as the target serving cell for the mobile device is further based on the indication of the application utilizing the at least one of the processor or the memory of the mobile device.

16. A computer storage medium having computer-executable instructions stored thereon that, when executed by a processor of a mobile device, cause the processor to perform operations comprising:
receiving a system information block comprising cell-type information of a current cell associated with the mobile device, first cell-type information of a first neighbor cell of a plurality of neighbor cells to the current cell, first cell load information of the first neighbor cell, second cell-type information of a second neighbor cell of the plurality of neighbor cells to the current cell, and second cell load information of the second neighbor cell,
wherein the first cell-type information of the first neighbor cell is different from the second cell-type information of the second neighbor cell;
determining a mobility state of the mobile device, the mobility state identifying a speed at which the mobile device is moving;
determining, based at least upon the cell-type information of the current cell, the first cell-type information of the first neighbor cell, the second cell-type information of the second neighbor cell, and the mobility state of the mobile device that the first neighbor cell and the second neighbor cell are both qualified to be a target cell for the mobile device; and
after determining that the first neighbor cell and the second neighbor cell are both qualified to be the target cell for the mobile device, selecting, based at least on the first cell load information of the first neighbor cell as compared with the second cell load information of the second neighbor cell, the first neighbor cell over the second neighbor cell as the target cell for the mobile device.

17. The computer storage medium of claim 16, wherein the system information block comprises an existing system information block that has been modified to include the cell-type information of the current cell, the first cell-type information of the first neighbor cell, and the second cell-type information of the second neighbor cell.

18. The computer storage medium of claim 16, wherein the operations further comprise receiving local device information comprising user rules associated with a user of the mobile device, wherein the user rules comprise an override selection of a particular cell-type to be selected if the particular cell-type is available, and wherein selecting the first neighbor cell over the second neighbor cell as the target cell for the mobile device is further based on the user rules.

19. The computer storage medium of claim 16, wherein:
the cell-type information of the current cell identifies the current cell as being of a macro cell-type;
the first cell-type information of the first neighbor cell of the plurality of neighbor cells identifies the first neighbor cell as being of a metro cell-type;
the second cell-type information of the second neighbor cell of the plurality of neighbor cells identifies the second neighbor cell as being of the macro cell-type;
the speed at which the mobile device is moving is conducive to both the metro cell-type and the macro cell-type; and
selecting the first neighbor cell over the second neighbor cell as the target cell is based upon the speed at which the mobile device is moving being conducive to the metro cell-type of the first neighbor cell and the first cell load information of the first neighbor cell indicating that a first cell load of the first neighbor cell is lower, relative to a capacity of the first neighbor cell, than a second cell load of the second neighbor cell.

20. The computer storage medium of claim 16, wherein the operations further comprise receiving an operator policy, and wherein selecting the first neighbor cell over the second neighbor cell as the target cell is further based upon the operator policy.

* * * * *